United States Patent [19]

Pusch et al.

[11] Patent Number: 4,467,005
[45] Date of Patent: Aug. 21, 1984

[54] IR-REFLECTING, WATER VAPOR-PERMEABLE FLEXIBLE WEB

[76] Inventors: Gunter Pusch, Bannholzweg 12, 6903 Neckargemund 2; Reinhold Weimar, Eichendorffstr. 11, 4772 Bad Sassendorf; Dieter E. Aisslinger, Heidestr. 54, 6222 Geisenheim, all of Fed. Rep. of Germany

[21] Appl. No.: 480,481

[22] Filed: Mar. 30, 1983

[51] Int. Cl.³ .................................................. B32B 5/12
[52] U.S. Cl. ...................................... 428/111; 428/109; 428/110; 428/233; 428/237; 428/238; 428/239; 428/240; 428/247; 428/257; 428/263; 428/283; 428/457; 428/919; 428/920; 428/921; 428/922; 428/938

[58] Field of Search ............... 428/233, 238, 239, 240, 428/247, 255, 919, 263, 457, 283, 109, 110, 111, 257, 922, 938, 920, 921

[56] References Cited

U.S. PATENT DOCUMENTS 4,323,613  4/1982  Snyder .................................. 428/247

*Primary Examiner*—James J. Bell
*Attorney, Agent, or Firm*—Michael N. Meller

[57] ABSTRACT

A support net is covered on each side with a carrier web having an external metal IR-reflecting coating and superposed thereon a protective coating which is substantially transparent to infrared radiation. The metal coatings and the protective coatings are thin enough to be substantially permeable to water vapor. The support net carries the load and allows water vapor to pass through because of its open net-like structure.

15 Claims, 2 Drawing Figures

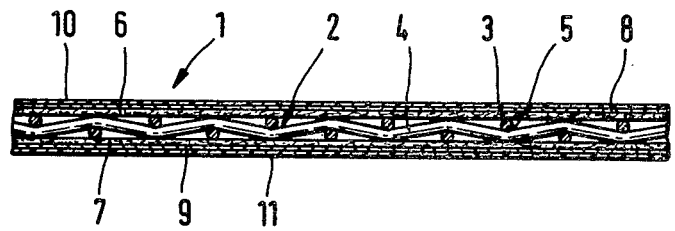
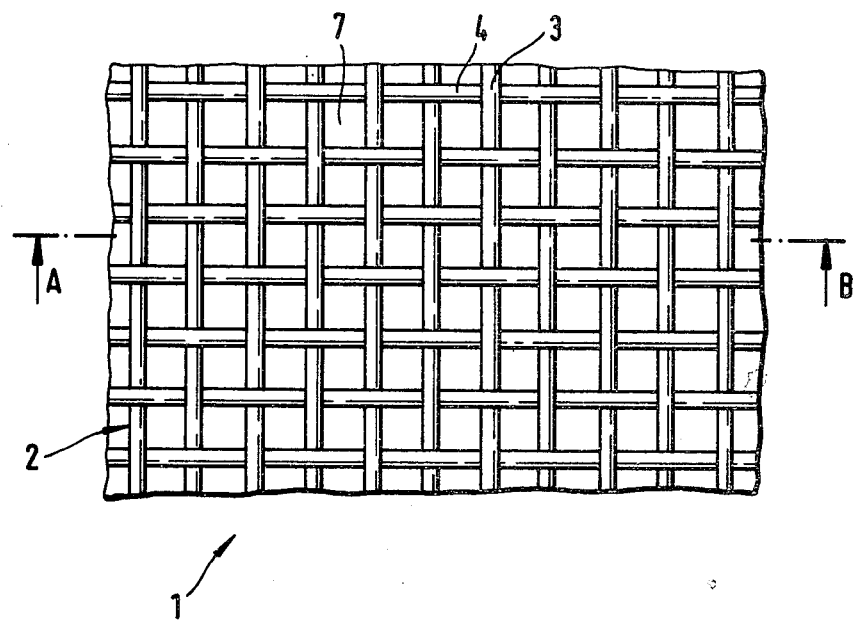

IR-REFLECTING, WATER VAPOR-PERMEABLE FLEXIBLE WEB

BACKGROUND OF THE INVENTION

The invention relates to an IR-reflecting, flexible web of material, for example for the purpose of covering, camouflaging and shading, as well as for tents and the like. Both sides of the web are provided with an IR-reflecting metal coating placed on a carrier web a protective layer that is substantially transparent to infrared radiation applied to the metal coating.

Webs of this kind are known for the manufacture of insulating blinds or the like and also for camouflage nets. They are distinguished by a high degree of thermal reflectivity because the protective layers are transparent to infrared radiation and the thermal radiation is thus reflected by the metal coatings. A particular advantage of these webs is the capability of coloring these webs without substantially reducing the thermal reflective properties.

For numerous applications, it is desired to have permeability to water vapor, in addition to thermal reflectivity. This is especially the case in building construction, for coverings and for packages. Until now, however, it has not been possible to combine these two properties so that there is present both high thermal reflection and the necessary permeability to water vapor.

SUMMARY OF THE INVENTION

Therefore, it is the object of the present invention to so embody a web of material of the type described hereinabove that it is permeable to water vapor without reducing the properties of thermal reflectivity.

This object is attained, according to the invention, by providing a support net and by affixing on both sides thereof a carrier web with external metallic and protective coatings, both the carrier webs and the metal and protective coatings being substantially permeable to molecular water vapor.

DETAILED DESCRIPTION

According to the invention, the stated object is attained by providing a three-layer construction of the web of material. This embodiment permits a clear division of the tasks to be performed and affords the possibility to realize the two desired properties in optimal fashion. In this construction, the support net has substantially only the task of accepting the mechanical, especially tensile loads and its net structure offers practically no barrier to passage of water vapor. The support net may be formed of conventional materials for this purpose such as nylon, polyvinyl, polyethylene, polypropylene and polyester. As the carrier webs are now relieved of mechanical loads, they now only have the task of providing a base for the heat-reflecting metal coatings and they can therefore be made thin enough to permit a high degree of permeability to water vapor. The three-layer structure according to the invention provides, for the first time, a web of material that can be used whenever an optimal thermal protection and permeability to water vapor are required simultaneously. The web can be adapted to wide ranges of expected mechanical stresses which also facilitates the vapor deposition process for creating the metal coating.

According to one embodiment of the invention, the support net is a coarse weave, preferably a lattice weave. In such a lattice weave, the longitudinal and transverse threads are separated and create spaces that are permeable to water vapor.

Less expensive than a lattice weave is the use of a lattice sandwich in which the transverse threads are laid over the longitudinal threads and are glued together at the crossing points. The production of this lattice sandwich is substantially more economical.

In a further development of the invention, it is provided that the support net consists of monofilament threads that are glued together or welded together at the crossing points. The strength of the threads can be adapted to the expected stresses. The same applies to the spaces between the individual threads.

Depending on the intended use, the carrier webs can consist of paper, plastic film, woven textile material, fibrous web or other areal structures. A fibrous web is especially suitable for this purpose as it is highly permeable to water vapor and can be made very thin while still having the required strength.

Suitably, the fixation of the carrier webs on the support net takes place by gluing. Two kinds of gluing are practical. In one kind of gluing, the carrier webs are glued only on the support net which may be done by applying adhesive to the carrier web in a continuous process whereafter the carrier webs are pressed on the support net. In the other kind of gluing, the inside surface of a carrier web is given a partial coating of adhesive, whereafter first the support net and then the second carrier web are deposited and pressed together. This can also be done in a continuous process between compression rollers. A preferred adhesive consists of a highly chlorinated PVdC in 50% water dispersion. A polyurethane adhesive can also be used.

Finally, the invention provides that the carrier web and the support net consist of a material that is difficult to ignite or non-flammable, a requirement that is made especially in building construction. Antimony trioxide or other commercially available flame-retarding additives may be incorporated for this purpose.

The invention is shown in greater detail with the aid of an exemplary embodiment illustrated in the drawing.

FIG. 1 is a cross section of a web of material along the plane A-B in FIG. 2; and FIG. 2 is a top view of the web shown in FIG. 1 after removing the upper carrier web.

The web of material 1 shown in cross section in FIG. 1 has a substantially three-layer structure. The middle layer or support web consists of a lattice weave 2 with monofilament threads 3,4 made of a suitable synthetic material such as nylon, polyvinyl, polyethylene, polypropylene, or polyester. The threads 3, 4 are glued together at the crossing points 5. Due to the spaces between the threads 3, 4, they present almost no impediment to the passage of water vapor. Their strength is chosen to withstand the expected mechanical loads, especially tensile stresses.

Fiber carrier webs 6, 7 preferably of synthetic materials such as polyester, polyethylene and polyvinylidene chloride, are applied adhesively to both sides of the lattice weave 2. Depending on the circumstances, some other material can also be used, for example woven textile material, paper or foil. The fiber webs 6, 7 are made relatively thin as they are relieved of mechanical loads by the presence of the support net, lattice weave 2. The thickness of the carrier webs is chosen to conform to the object of attaining maximum permeability to water vapor while retaining their waterproof quality, however.

The fiber webs 6, 7 provide the base for externally applied metal coatings 8, 9, such as aluminum or zinc, which are vapor deposited in vacuum. For camouflage purposes, the metal coating should preferably have a specific surface resistivity of 0.5 to 10 ohms per square. Protective layers 10, 11 are applied to protect the metal coatings 8, 9 against corrosion and mechanical damage. These protective layers 10, 11 consist of a material that is transparent to infrared radiation, for example, chlorinated polypropylene, butyl rubber, a specially formulated polyethylene, such as a polyethylene-vinyl acetate copolymer or an isomerized rubber (cyclo-rubber). They are made so thin as to absorb practically none of the IR radiation while being permeable to molecular water vapor. Thus, a high percentage of the IR radiation is reflected by the metal coatings so that both sides of the web 1 offer practically complete thermal insulation against radiative heat. Coloring particles may be embedded in the protective layers 10, 11 to cover the metal coatings 8,9 and to impart to the web 1 a desired colored appearance or to prevent the occurrence of some undesirable reflection in the visible part of the spectrum. Conventional camouflage pigments include chromium oxide hydrate green, chromium oxide green, 4-chloro-2-nitranilide, azine black toner, toludine red toner, titanium oxide, iron oxide and ultramarine blue. For shades, tints, etc. where camouflage is not needed, pigments are used which have arbitrary absorption in the 400 to 900 mm wavelength range to achieve a visual colored effect. In a manner known from the production of insulating blinds, the embedding of pigment particles substantially retains the IR-transparency so that the thermal reflective properties of the web 1 are not reduced. The pigments are selected with a size distribution such as to be relatively larger than the wavelength of the radiation in the optical range and relatively small compared to the wavelength of the infrared radiation range. The layer thickness is selected as thin as possible so that where feasible merely two plies of pigments will be present in the layer.

FIG. 2 is a top view of the web of material 1 with the upper fiber carrier web 6 having been removed, permitting a view of the structure of the support net, lattice weave 2 and its longitudinal and transverse threads 3, 4, respectively. The lattice weave 2 can also be replaced by a lattice sandwich.

EXAMPLES

In an effort to provide some descriptive, although non-limiting examples, the following are presented to enable a more complete understanding of the invention.

EXAMPLE 1

The support net consists of lattice weave monofilament threads of nylon glued together at the crossing points with an adhesive consisting of a 50% aqueous dispersion of a highly chlorinated polyvinylidene chloride. On each side of the support web there is applied adhesively, using the same adhesive, a fiber carrier web consisting of polyester fibers coated with a coating of aluminum vapor deposited in vacuum and having a specific surface resistivity of 0.5 to 10 ohms per square. The metal coating is covered with a protective coating of chlorinated polypropylene containing chromium oxide green pigment.

EXAMPLE 2

The same construction as in Example 1 wherein the support net consists of woven polyester textile material, the fiber carrier web consists of polyethylene, the adhesive is a polyurethane adhesive, the metal is aluminum and the protective coating consists of a polyethylene-vinyl acetate copolymer containing an ultramarine blue pigment.

EXAMPLE 3

The same construction as in Example 1 wherein the support net consists of a lattice sandwich of polyvinyl, the fiber carrier web consists of paper, the adhesive is a polyurethane adhesive, the metal is zinc, and the protective coating consists of cyclo-rubber containing azine black toner pigment.

Although the invention has been illustrated by reference to a particular embodiment, it is to be understood that the invention is not to be limited to this embodiment but that many variations may be made without departing from the scope of the invention as defined by the claims.

We claim:
1. An infrared-reflecting, water vapor-permeable, flexible web comprising a support net, a carrier web affixed to each side of said support net, an external infrared-reflecting metal coating on each of said carrier webs, and an external protective coating on each of said metal coatings, wherein said metal coatings and said protective coatings are substantially permeable to water vapor, and said protective coatings are substantially transparent to infrared radiation.

2. The infrared-reflecting web according to claim 1, wherein the support net is a coarse weave.

3. The infrared-reflecting web according to claim 2, wherein the support net is a lattice weave.

4. The infrared-reflecting web according to claim 1, wherein the support net is a lattice sandwich.

5. The infrared-reflecting web according to claim 2, wherein the support net consists of monofilament threads that are glued or welded together at crossing points of the threads.

6. The infrared-reflecting web according to claim 1, wherein the carrier webs consist of paper.

7. The infrared-reflecting web according to claim 1, wherein the carrier webs consist of a woven textile material.

8. The infrared-reflecting web according to claim 1, wherein the carrier webs consist of a synthetic fiber web.

9. The infrared-reflecting web according to claim 1, wherein the carrier webs are glued to the support net.

10. The infrared-reflecting web according to claim 1, wherein the carrier webs and the support net consist of a material that is flame resistant.

11. The infrared-reflecting web according to claim 1, wherein the metal coating is a vapor deposited metal selected from the group consisting of aluminum and zinc having a specific surface resistivity of 0.5 to 10 ohms per square.

12. The infrared-reflecting web according to claim 11, wherein the protective coating is selected from the group consisting of chlorinated polypropylene, butyl rubber, cyclo-rubber and a polyethylene-vinyl acetate copolymer.

13. The infrared-reflecting web according to claim 12, wherein the protective layer contains particles of pigments selected from the group consisting of chromium oxide hydrate green, chromium oxide green, 4-chloro-2-nitranilide, azine black toner, toludine red toner, titanium oxide, iron oxide and ultramarine blue.

14. The infrared-reflecting web according to claim 13, wherein the support net is made of a synthetic material selected from the group consisting of nylon, polyvinyl, polyethylene, polypropylene and polyester.

15. The infrared-reflecting web according to claim 14, wherein the carrier web is made of a material selected from the group consisting of polyester, polyethylene and polyvinylidene chloride.

* * * * *